United States Patent [19]

Seifahrt

[11] 4,225,768

[45] Sep. 30, 1980

[54] COATED ELECTRODE SUITABLE FOR THE WELDING OF GRAY CAST IRON PARTS

[75] Inventor: Horst Seifahrt, Lausanne, Switzerland

[73] Assignee: Castolin S.A., St. Sulpice, Switzerland

[21] Appl. No.: 958,601

[22] Filed: Nov. 8, 1978

[30] Foreign Application Priority Data

Nov. 8, 1977 [CH] Switzerland .................. 13572/77

[51] Int. Cl.² ................................. B23K 35/30
[52] U.S. Cl. ...................... 219/76.14; 219/146.1; 219/146.24
[58] Field of Search ....... 219/146.1, 137 WM, 146.24, 219/76.14; 145/23, 24

[56] References Cited

U.S. PATENT DOCUMENTS

| | | | |
|---|---|---|---|
| 1,942,364 | 5/1933 | Rood | 219/137 WM |
| 2,855,333 | 10/1958 | Wasserman | 219/146.1 |
| 3,108,020 | 10/1963 | Willigen | 148/24 X |
| 3,995,139 | 11/1976 | Bouvard | 148/24 X |
| 4,103,067 | 7/1978 | Jackson | 148/24 X |

FOREIGN PATENT DOCUMENTS

125853 10/1966 U.S.S.R. .................. 219/146.1

*Primary Examiner*—Richard R. Kucia
*Attorney, Agent, or Firm*—Hopgood, Calimafde, Kalil, Blaustein and Lieberman

[57] ABSTRACT

A coated electrode suitable for the welding of gray cast iron is provided comprising a core of iron or iron alloy with a coating thereon of a composition which on the dry weight basis contains 5% to 10% of a binder of an alkali metal silicate, 25% to 50% by weight of ferrovanadium containing 40% to 85% vanadium, 20% to 40% powdered iron, 15% to 20% $BaCO_3$, 10% to 20% $CaF_2$, and 1% to 3% ferrosilicon containing 30% to 80% silicon. It is preferred in welding a gray cast iron part to so arrange the electrode relative to the part so that the arc thereof is directed at an angle between 30° and 60° to the substrate surface so that the heat of the arc is not applied directly to the surface of the cast iron substrate but is absorbed substantially by the weld bead formed during welding.

10 Claims, No Drawings

COATED ELECTRODE SUITABLE FOR THE WELDING OF GRAY CAST IRON PARTS

The present invention relates to a coated electrode for the welding, in particular, of parts of gray cast iron, as well as the use of this electrode for the buildup welding and assembling of parts of gray cast iron without preheating.

Upon the building-up of the surface of a part of gray cast iron or upon the assembling of two parts of this material using an electric arc by means of an electrode having a base of iron, it is frequently necessary, and always desirable, to operate without preheating the base parts. However, in such case the carbon contained in the base part diffuses towards the filler and causes the formation in the latter of iron carbide, $Fe_3C$, which is very stable and very hard. The presence of this iron carbide substantially decreases the malleability and ductility in the transition zone between the base part and the filler and makes the welded part hard, fragile, and difficult to machine.

It has already been proposed to use coated welding electrodes composed of a core of soft steel and a coating which contains at least one element which produces special stable carbides selected from among titanium, vanadium and niobium, which make it possible to avoid the formation of iron carbide, $Fe_3C$. However, the use of electrodes of the compositions proposed does not make it possible to obtain satisfactory results in actual practice. As a matter of fact, the composition of the coatings recommended is such that the welding requires the use of an arc of high energy and thus leads to an extensive heating of the base part. Thus the zone of fusion in the base metal becomes relatively deep and therefore the carbon content in the deposit becomes too great, which leads to too large a quantity of carbides. The weld obtained in this manner, therefore, does not have the required properties.

The object of the present invention is to overcome the aforementioned drawbacks and to provide an electrode for the cold welding of gray cast iron which has a core formed of iron or an iron alloy and which makes it possible to obtain a weld having excellent mechanical properties and in particular very good malleability and a very high resistance to cracking.

For this purpose, the electrode of the invention which comprises a core formed of iron or of an iron alloy is characterized by the fact that its coating comprises, in addition to a binder having a base of alkali metal silicates forming 5 to 10% of the coating in dry condition, a mixture having the following composition by weight:

25 to 50% ferrovanadium, containing 40 to 85% vanadium
20 to 40% of powdered iron
15 to 20% of $BaCO_3$
10 to 20% of $CaF_2$
1 to 3% of ferrosilicon, containing 30 to 80% silicon and
1 to 2% organic binder.

In accordance with a preferred embodiment, the said mixture furthermore contains up to 20% ferroniobium containing 40 to 85% niobium, up to 10% $CaCO_3$ and up to 2% of ferromanganese containing 50 to 90% manganese. Particularly favorable results have been obtained by the use in the proportions indicated of ferrovanadium containing 50% vanadium, ferrosilicon containing 45% silicon, ferroniobium containing 60% niobium, and ferromanganese containing 80% manganese. The central core of the electrode is preferably of a mild steel containing at most 0.2% carbon, less than 1% silicon, 0.4 to 0.6% manganese, less than 0.03% phosphorus, less than 0.03% sulfur, and the usual trace elements which are customary in steels.

The weight proportion of the coating with respect to the total weight of the electrode is preferably between 45 and 55%.

The use of such an electrode makes it possible to produce connections or buildups of parts of gray cast iron without preheating, with only very slight heating up of the base parts, which reduces the size of the mixing zone and furthermore avoids the production of internal tensions as a result of the welding.

The advantages inherent in the electrode composition according to the invention may be still further increased by a hammering of the bead as the filler is deposited. More particularly, in the case of the building up of a part of gray cast iron, the filler is applied by arranging the base part in such a manner that the surface thereof which receives the filler is inclined at an angle of between 30° and 60° with respect to the direction of the welding arc. Thus the thermal energy of the arc is not applied directly to the base part, but the surface of the latter is isolated from the arc by the weld bead, making it possible to obtain a substantial additional reduction in the heating of the base part.

Other properties, advantages and embodiments of the electrode of the invention will become evident from the following examples.

EXAMPLE 1

A gray cast iron part is built-up using a coated electrode having a central core of a diameter of 3.2 mm of soft steel having the composition:

C: 0.05%
Si: 0.5%
Mn: 0.5%
P: 0.02%
S: 0.02%
Fe and customary traces: the balance.

The coating of this electrode comprises about 7% residual solids from an ordinary binder having a base of sodium and potassium silicates and a mixture having the following composition by weight:

30% ferrovanadium containing 50% vanadium
16% $CaF_2$
1% ferromanganese
2% ferrosilicon containing 45% silicon
30% iron powder
5% $CaCO_3$
15% $BaCO_3$ and
1% of an organic binder (alginate).

The relative proportions by weight of the core and the coating are as follows:
core 51%; coating 49%.

A DC arc welding unit is used, connecting the welding electrode to the positive pole and passing a current of 110 amperes through it. During the welding, the surface of the base part is maintained inclined at an angle of 45° with respect to the direction of the arc. After each application of the weld bead, the bead is hammered in the customary manner.

In this way three successive layers of filler are deposited. The layer thus obtained is free of cracks and pores and it lends itself very well to surface grinding without crumbling as well as to machining by means of chip removing tools.

EXAMPLE 2

One proceeds in the same manner as in Example 1, using an electrode having the same core but the coating of which contains in the said mixture according to Example 1:

25% by weight ferrovanadium of 50% vanadium and
5% by weight ferroniobium of 60% niobium, the composition of the coating being otherwise the same as in Example 1.

The filler layer thus obtained also has excellent mechanical properties and can easily be machined.

The advantages of the electrode of the invention are based, on the one hand, on the presence in the coating of the indicated quantities of ferrovanadium, the vanadium forming very fine stable carbides which impart the abovementioned mechanical properties to the weld. It should be noted that this vanadium may have added thereto, or be partly replaced by niobium or else zirconium, titanium, or tantalum, in all cases in the form of iron alloys. In point of fact, a relatively small amount of niobium, for instance, which forms coarser carbide particles than vanadium, is entirely acceptable and contributes to assuring good malleability of the weld. In general, the most advantageous electrodes have proven to be those which supply in the deposited material, between 5 and 15% by weight of elements which form stable carbides, particularly vanadium and niobium.

Another feature which is of importance for the advantages obtained in the present electrode is the presence of powdered iron, which upon its fusion absorbs a substantial part of the energy of the arc and thus makes it possible to reduce the amount by which the base part is heated.

However it should also be noted that the weld properties obtained by the electrode in accordance with the invention are based on the selection and proportions of the different components as a whole. It should also be noted that the core of the electrode may be a weakly alloyed steel, preferably alloyed with elements which are also contained in the coating.

I claim:

1. A coated electrode suitable for the welding of gray cast iron consisting essentially of a core of iron or iron alloy with a coating thereon of a composition which on the dry weight basis contains 5% to 10% of a binder of an alkali metal silicate, 25% to 50% by weight of ferrovanadium containing 40% to 85% vanadium, 20% to 40% powdered iron, 15% to 20% $BaCO_3$, 10% to 20% $CaF_2$, and 1% to 3% ferrosilicon containing 30% to 80% silicon.

2. The coated electrode of claim 1, wherein the coating optionally includes one or more of 0% to 20% ferroniobium containing 40% to 85% niobium, 0% to 2% ferromanganese containing 50% to 90% manganese, 0% to 10% $CaCO_3$, and 1% to 2% of an organic binder.

3. The coated electrode of claim 2, wherein the ferrovanadium contains 50% vanadium, the ferrosilicon contains 45% silicon, the ferroniobium contains 60% niobium and the ferromanganese contains 80% manganese.

4. The coated electrode of claim 1, wherein the amount of coating ranges from 45% to 55% of the total weight of the electrode.

5. The coated electrode of claim 2, wherein the composition of the coating contains 30% ferrovanadium containing 50% vanadium, 30% powdered iron, 15% $BaCO_3$, 16% $CaF_2$, 2% ferrosilicon containing 45% silicon, 5% $CaCO_3$, 1% ferromanganese containing 80% manganese and 1% organic binder.

6. A method for the buildup arc welding of a gray cast iron substrate which comprises, subjecting said part to welding using a coated electrode consisting essentially of a core of iron or iron alloy with a coating thereon of a composition which on the dry weight basis contains 5% to 10% of a binder of an alkali metal silicate, 25% to 50% by weight of ferrovanadium containing 40% to 85% vanadium, 20% to 40% powdered iron, 15% to 20% $BaCO_3$, 10% to 20% $CaF_2$, and 1% to 3% ferrosilicon containing 30% to 80% silicon, said coated electrode being arranged relative to the cast iron substrate being welded such that the arc is directed at an angle between 30° and 60° to the substrate surface, whereby the heat of the arc is not applied directly to the surface of the cast iron substrate and is absorbed substantially by the weld bead formed during welding.

7. The method of claim 6, wherein the coated electrode employed optionally includes one or more of 0% to 20% ferroniobium containing 40% to 85% niobium, 0% to 2% ferromanganese containing 50% to 90% manganese, 0% to 10% $CaCO_3$, and 1% to 2% organic binder.

8. The method of claim 7, wherein the ferrovanadium in the coating contains 50% vanadium, the ferrosilicon contains 45% silicon, the ferroniobium contains 60% niobium and the ferromanganese contains 80% manganese.

9. The method of claim 6, wherein the amount of coating ranges from 45% to 55% of the total weight of the electrode.

10. The method of claim 7, wherein the composition of the coating contains 30% ferrovanadium containing 50% vanadium, 30% powdered iron, 15% $BaCO_3$, 16% $CaF_2$, 2% ferrosilicon containing 45% silicon, 5% $CaCO_3$, 1% ferromanganese containing 80% manganese and 1% organic binder.

* * * * *